(12) United States Patent
Yang et al.

(10) Patent No.: US 12,531,681 B2
(45) Date of Patent: Jan. 20, 2026

(54) DYNAMIC APERIODIC SRS SLOT OFFSET INDICATION

(71) Applicant: QUALCOMM Incorporated, San Diego, CA (US)

(72) Inventors: Wei Yang, San Diego, CA (US); Alexandros Manolakos, Escondido, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 17/796,171

(22) PCT Filed: Feb. 4, 2020

(86) PCT No.: PCT/CN2020/074266
§ 371 (c)(1),
(2) Date: Jul. 28, 2022

(87) PCT Pub. No.: WO2021/155492
PCT Pub. Date: Aug. 12, 2021

(65) Prior Publication Data
US 2023/0114925 A1    Apr. 13, 2023

(51) Int. Cl.
*H04L 5/00* (2006.01)
*H04W 72/0446* (2023.01)
*H04W 72/232* (2023.01)

(52) U.S. Cl.
CPC .......... *H04L 5/0048* (2013.01); *H04L 5/0094* (2013.01); *H04W 72/0446* (2013.01); *H04W 72/232* (2023.01)

(58) Field of Classification Search
CPC ... H04L 5/0048; H04L 5/0094; H04L 5/0026; H04L 5/0087; H04L 27/2613; H04L 5/001; H04L 5/0053; H04L 5/14; H04L 5/0091; H04W 72/0446; H04W 72/232
See application file for complete search history.

(56) References Cited

U.S. PATENT DOCUMENTS

| | | | |
|---|---|---|---|
| 2013/0121279 A1 | 5/2013 | Noh et al. | |
| 2019/0174466 A1* | 6/2019 | Zhang | H04L 5/0057 |
| 2019/0190582 A1* | 6/2019 | Guo | H04L 1/0061 |

(Continued)

FOREIGN PATENT DOCUMENTS

| | | |
|---|---|---|
| CN | 105049164 A | 11/2015 |
| CN | 109842472 A | 6/2019 |

(Continued)

OTHER PUBLICATIONS

Supplementary European Search Report—EP20917945—Search Authority—The Hague—Oct. 2, 2023.

(Continued)

*Primary Examiner* — Liem H. Nguyen
(74) *Attorney, Agent, or Firm* — Loza & Loza, LLP/Qualcomm

(57) ABSTRACT

Aspects relate to dynamic sounding reference signal (SRS) slot offset indication in a wireless communication system using aperiodic SRS. An indicator field is utilized to signal the slot offset indication to a user equipment (UE). Other aspects, embodiments, and features are also claimed and described.

30 Claims, 11 Drawing Sheets

(56) References Cited

U.S. PATENT DOCUMENTS

| | | | |
|---|---|---|---|
| 2019/0281588 A1* | 9/2019 | Zhang | H04W 52/08 |
| 2019/0297603 A1* | 9/2019 | Guo | H04L 5/0053 |
| 2019/0349964 A1* | 11/2019 | Liou | H04B 7/0626 |
| 2020/0028638 A1 | 1/2020 | Liu et al. | |
| 2020/0029274 A1* | 1/2020 | Cheng | H04W 76/28 |
| 2020/0252241 A1* | 8/2020 | Park | H04L 25/0224 |
| 2021/0135816 A1* | 5/2021 | Davydov | H04L 5/0091 |
| 2021/0409178 A1* | 12/2021 | Faxér | H04L 5/0053 |
| 2022/0330300 A1* | 10/2022 | Wang | H04W 72/20 |
| 2022/0353698 A1* | 11/2022 | Jang | H04L 5/0053 |
| 2022/0377619 A1* | 11/2022 | Grant | H04L 5/0044 |
| 2024/0214152 A1* | 6/2024 | Faxér | H04W 72/1273 |

FOREIGN PATENT DOCUMENTS

| | | | | |
|---|---|---|---|---|
| CN | 110324124 A | | 10/2019 | |
| CN | 110460416 A | | 11/2019 | |
| CN | 110650001 A | | 1/2020 | |
| CN | 111885683 A | * | 11/2020 | H04B 7/0626 |
| EP | 3471327 A1 | | 4/2019 | |
| EP | 4047850 A1 | | 8/2022 | |
| KR | 20190086332 A | * | 7/2019 | H04B 7/0602 |
| WO | 2020034305 A1 | | 2/2020 | |
| WO | WO-2020084362 A1 | * | 4/2020 | H04L 27/2613 |

OTHER PUBLICATIONS

International Search Report and Written Opinion—PCT/CN2020/074266—ISA/EPO—Oct. 29, 2020.
Sony: "Remaining Issues on SRS", 3GPP TSG RAN WG1 Meeting#92, R1-1802061, Mar. 2, 2018, (Mar. 2, 2018), 4 pages, Section 2.
ZTE, et al., Evolution of NR MIMO in Rel-17, 3GPP TSG RAN Meeting#85, RP-191845, Sep. 20, 2019 (Sep. 20, 2019), 8 pages, the whole document.

* cited by examiner

DYNAMIC APERIODIC SRS SLOT OFFSET INDICATION

CROSS-REFERENCE TO RELATED APPLICATION(S)

This application is the U.S. national stage of PCT patent application number PCT/CN2020/074266 filed on Feb. 4, 2020.

TECHNICAL FIELD

The technology discussed below relates generally to wireless communication systems and, more particularly, to sounding reference signal (SRS) slot offset indication (e.g., aperiodic SRSs or A-SRS). Embodiments can provide and enable techniques for a base station or a user equipment to indicate a slot offset for A-SRS (e.g., indication in a downlink control indicator (DCI)).

INTRODUCTION

In wireless communication systems, such as those conforming to 3GPP's 5G new radio (NR) specifications, sounding reference signals (SRSs) are reference signals from a user equipment (UE) that are used by a base station or NodeB (e.g., a gNodeB or gNB) to determine the channel quality of an uplink (UL) path. In some systems or system settings, SRS transmission may be set or predetermined with a radio resource control (RRC) to be periodically or semi-persistently transmitted at intervals on uplink (UL) channels. In other systems or system settings, a base station may schedule a UE to transmit an aperiodic SRS (A-SRS) on the physical uplink shared channel (PUSCH) using either a UL grant or a downlink (DL) grant with an RRC configured slot offset indication for a respective SRS resource set (i.e., an SRS resource including locations of SRS in the time and frequency domains within a resource grid and the "set" containing a set of SRS resources transmitted by one UE).

As the demand for mobile broadband access continues to increase, research and development continue to advance wireless communication technologies not only to meet the growing demand for mobile broadband access, but to advance and enhance the user experience with mobile communications including enhancing A-SRS transmissions.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to an aspect, a method of wireless communication is disclosed that includes configuring a plurality of slot offset values for aperiodic sounding reference signal (SRS) transmissions for at least one SRS resource set. Additionally, the method includes sending a slot offset value indicator to the UE. A slot offset value indicator can be configured to indicate a particular slot offset value. The slot offset value can apply to one or more of the plurality of slot offset values. A UE can use one or more slot offset values for transmitting at least one SRS transmission.

In yet another aspect, an apparatus for wireless communication is disclosed having means for determining a plurality of slot offset values for aperiodic sounding reference signal (SRS) transmissions for at least one SRS resource set. Further, the apparatus includes means for sending a slot offset value indicator to the UE. A slot offset value indicator can be configured to indicate a particular slot offset value. The slot offset value can apply to one or more of the plurality of slot offset values. A UE can use one or more slot offset values for transmitting at least one SRS transmission.

According to another aspect, a non-transitory computer-readable medium storing computer-executable code is disclosed. The code includes code for causing a computer to determine a plurality of slot offset values for aperiodic sounding reference signal (SRS) transmissions for at least one SRS resource set. The code also includes code for causing a computer to send a slot offset value indicator to the UE. the slot offset value indicator configured to indicate a particular slot offset value of the plurality of slot offset values to be used by the UE for transmitting at least one SRS transmission.

In still another aspect, an apparatus for wireless communication is disclosed. The apparatus includes at least one processor, a transceiver communicatively coupled to the at least one processor, and a memory communicatively coupled to the at least one processor. The at least one processor is further configured to determine a plurality of slot offset values for aperiodic sounding reference signal (SRS) transmissions for at least one SRS resource set. Also, the at least one processor is configured to send a slot offset value indicator to the UE. A slot offset value indicator can be configured to indicate a particular slot offset value. The slot offset value can apply to one or more of the plurality of slot offset values. A UE can use one or more slot offset values for transmitting at least one SRS transmission.

According to further disclosed aspect, a method of wireless communication includes receiving a slot offset value indicator in a UE, wherein the slot offset value indicator is configured to indicate a particular slot offset value of a plurality of slot offset values for aperiodic sounding reference signal (A-SRS) transmissions by the UE. The method further includes determining a slot offset to transmit at least one A-SRS transmission based on the received slot offset value indicator, and transmitting the at least one A-SRS transmission with the determined slot offset.

In yet another aspect, an apparatus for wireless communication is disclosed. The apparatus includes means for receiving a slot offset value indicator in a UE, wherein the slot offset value indicator is configured to indicate a particular slot offset value of a plurality of slot offset values for aperiodic sounding reference signal (A-SRS) transmissions by the UE. Moreover, the apparatus includes means for determining a slot offset to transmit at least one A-SRS transmission based on the received slot offset value indicator, and means for transmitting the at least one aperiodic SRS transmission with the determined slot offset.

According to another aspect, a non-transitory computer-readable medium storing computer-executable code is disclosed. The code includes code for causing a computer to receive a slot offset value indicator in a UE, wherein the slot offset value indicator is configured to indicate a particular slot offset value of a plurality of slot offset values for aperiodic sounding reference signal (A-SRS) transmissions by the UE. Additionally, the code includes code for causing a computer to determine a slot offset to transmit at least one A-SRS transmission based on the received slot offset value indicator, and transmit the at least one A-SRS transmission with the determined slot offset.

In still one more aspect, an apparatus for wireless communication is disclosed that includes at least one processor, a transceiver communicatively coupled to the at least one processor, and a memory communicatively coupled to the at least one processor. Further, the at least one processor is configured to receive a slot offset value indicator in a UE, wherein the slot offset value indicator is configured to indicate a particular slot offset value of a plurality of slot offset values for aperiodic sounding reference signal (A-SRS) transmissions by the UE. Also, the at least one processor is configured to determine a slot offset to transmit at least one A-SRS transmission based on the received slot offset value indicator, and transmit the at least one A-SRS transmission with the determined slot offset.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
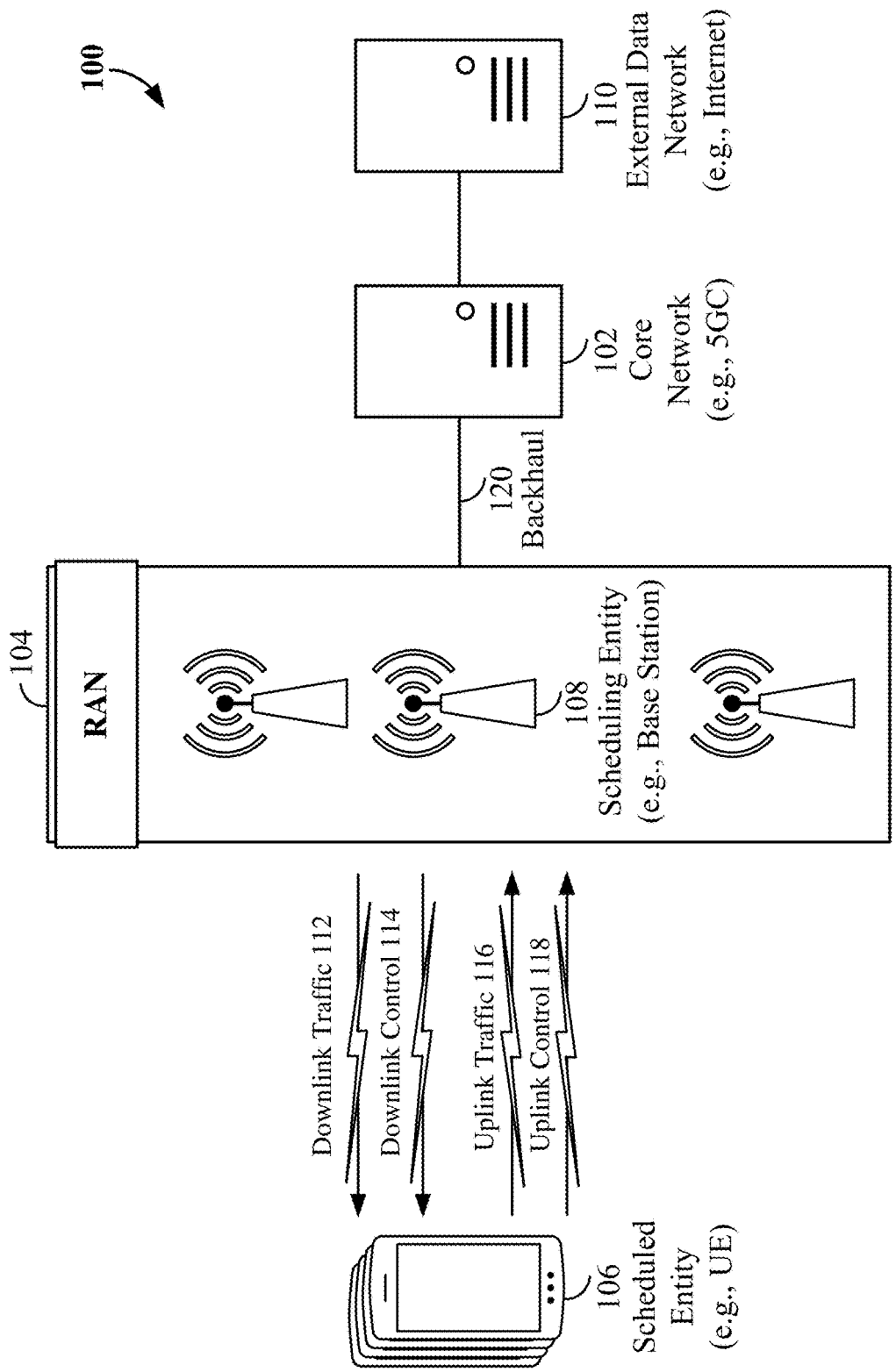
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

In previous 5G NR releases (e.g., Releases 15 and 16), a base station or gNB could be configured to schedule a UE to transmit an aperiodic SRS (e.g. the scheduling including DCI triggering or signaling to a UE to transmit the SRS) on the physical uplink shared channel (PUSCH) using either a UL grant or a DL grant with an RRC configured slot offset per SRS resource set. Once the slot offset is configured under these specifications, however, the offset is fixed. Accordingly, the present disclosure enables and provides for an A-SRS transmission. An A-SRS transmission, according to some aspects, can include providing a dynamic or flexible slot offset indication through various signaling mechanisms to afford the flexible slot offset indication. Multiple A-SRS transmissions can occur at varying paces or in response to various triggers to provide dynamic information updates related to slot offset values.

Before discussing the various aspects to the present disclosure, the following contextual definitions are included to define various terminology used herein. Applicant aims to promote clarity by offering context on these terms. These terms are understood by those of ordinary skill in the art and Applicant does not intend to define these terms differently than used ordinary and normally by those of ordinary skill in the art.

Definitions

RAT: radio access technology. Generally refers to type of technology or communication standard utilized for radio access and communication over a wireless air interface. A few example RATs include GSM, UTRA, E-UTRA (LTE), Bluetooth, 5G NR, and Wi-Fi.

NR: new radio. Generally refers to 5G technologies and the new radio access technology undergoing definition and standardization by 3GPP in Release 15.

Legacy compatibility: Generally refers to the capability of a 5G network to provide connectivity to pre-5G devices, and the capability of 5G devices to obtain connectivity to a pre-5G network.

Multimode device: Generally refers to a device that can provide simultaneous connectivity across different networks, such as 5G, 4G, and Wi-Fi networks.

CA: carrier aggregation. 5G networks may provide for aggregation of sub-6 GHz carriers, above-6 GHz carriers, mmWave carriers, etc., all controlled by a single integrated MAC layer.

MR-AN: multi-RAT radio access network. A single radio access network may provide one or more cells for each of a plurality of RATs, and may support inter- and intra-RAT mobility and aggregation.

MR-CN: multi-RAT core network. A single, common core network may support multiple RATs (e.g., 5G, LTE, and WLAN). In some examples, a single 5G control plane may support the user planes of a plurality of RATs by utilizing software-defined networking (SDN) technology in the core network.

SDN: software-defined networking. Generally refers to a dynamic, adaptable network architecture that may be managed by way of abstraction of various lower-level functions of a network, enabling the control of network functions to be directly programmable.

SDR: software-defined radio. Generally refers to a dynamic, adaptable radio architecture where many signal processing components of a radio such as amplifiers, modulators, demodulators, etc. are replaced by software functions. SDR enables a single radio device to communicate utilizing different and diverse waveforms and RATs simply by reprogramming the device.

mmWave: millimeter-wave. Generally refers to high bands above 24 GHz, which can provide a very large bandwidth. Also, mmWave generally refers to those wavelengths in the FR2 band defined in the 3GPP NR specifications (e.g., 3GPP Release 15).

Beamforming: directional signal transmission or reception. For a beamformed transmission, the amplitude and phase of each antenna in an array of antennas may be precoded, or controlled to create a desired (e.g., directional) pattern of constructive and destructive interference in the wavefront.

MIMO: multiple-input multiple-output. Generally, MIMO is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another. Examples include:
  1. In single-user MIMO, the transmitter sends one or more streams to the same receiver, taking advantage of capacity gains associated with using multiple Tx, Rx antennas in rich scattering environments where channel variations can be tracked.
  2. The receiver may track these channel variations and provide corresponding feedback to the transmitter. This feedback may include channel quality information (CQI), the number of preferred data streams (e.g., rate control, a rank indicator (RI)), and a precoding matrix index (PMI).

Massive MIMO: a MIMO system with a very large number of antennas (e.g., greater than an 8×8 array).

MU-MIMO: a multi-antenna technology where base station, in communication with a large number of UEs, can exploit multipath signal propagation to increase overall network capacity by increasing throughput and spectral efficiency, and reducing the required transmission energy. An example includes:
  1. The transmitter may attempt to increase the capacity by transmitting to multiple users using its multiple transmit antennas at the same time, and also using the same allocated time-frequency resources. The receiver may transmit feedback including a quantized version of the channel so that the transmitter can schedule the receivers with good channel separation. The transmitted data is precoded to maximize throughput for users and minimize inter-user interference.

AS: access stratum. Generally relates to a functional grouping consisting of the parts in the radio access network and in the UE, and the protocols between these parts being specific to the access technique (i.e., the way the specific physical media between the UE and the radio access network is used to carry information).

NAS: non-access stratum. Protocols between UE and the core network that are not terminated in the radio access network.

RAB: radio access bearer. Generally refers to the service that the access stratum provides to the non-access stratum for transfer of user information between a UE and the core network.

Network slicing: a wireless communication network may be separated into a plurality of virtual service networks (VSNs), or network slices. In some scenarios, network slices may be separately configured to better suit the needs of different types of services. Some wireless communication networks may be separated, e.g., according to eMBB, IoT, and URLLC services.

eMBB: enhanced mobile broadband. Generally, eMBB refers to the continued progression of improvements to existing broadband wireless communication technologies such as LTE. eMBB provides for (generally continuous) increases in data rates and increased network capacity.

IoT: the Internet of things. In general, this refers to the convergence of numerous technologies with diverse use cases into a single, common infrastructure. Most discussions of the IoT focus on machine-type communication (MTC) devices.

URLLC: ultra-reliable and low-latency communication. Sometimes equivalently called mission-critical communication. Reliability refers to the probability of success of transmitting a given number of bytes within 1 millisecond (ms) under a given channel quality. Ultra-reliable refers to a high target reliability, e.g., a packet success rate greater than 99.999%. Latency refers to the time it takes to successfully deliver an application layer packet or message. Low-latency refers to a low target latency, e.g., 1 ms or even 0.5 ms (for comparison, a target for eMBB may be 4 ms).

MTC: machine-type communication. Generally, a form of data communication that involves one or more entities that do not necessarily need human interaction. Optimization of MTC services differs from that for human-to-human communications because MTC services generally involve different market scenarios, data communications, lower costs and effort, a potentially very large number of communicating terminals, and, to a large extent, little traffic per terminal. (See 3GPP TS 22.368.)

Duplex: a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and interference cancellation techniques. Full duplex emulation is frequently implemented for wireless links by utilizing frequency division duplex (FDD) or time division duplex (TDD). In FDD, the transmitter and receiver at each endpoint operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction.

OFDM: orthogonal frequency division multiplexing. Generally, an air interface may be defined according to a two-dimensional grid of resource elements, defined by separation of resources in frequency by defining a set of closely spaced frequency tones or sub-carriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers.

CP: cyclic prefix. Generally, a multipath environment degrades the orthogonality between subcarriers because symbols received from reflected or delayed paths may overlap into the following symbol. A CP addresses this problem by copying the tail of each symbol and pasting it onto the front of the OFDM symbol. In this way, any multipath components from a previous symbol fall within the effective guard time at the start of each symbol, and can be discarded.

Scalable numerology: in OFDM, to maintain orthogonality of the subcarriers or tones, the subcarrier spacing is equal to the inverse of the symbol period. Generally, a scalable numerology refers to the capability of the network to select different subcarrier spacings, and accordingly, with each spacing, to select the corresponding symbol period. The symbol period should be short enough that the channel does not significantly vary over each period, in order to preserve orthogonality and limit inter-subcarrier interference.

RSMA: resource spread multiple access. Generally, a non-orthogonal multiple access scheme generally characterized by small, grantless data bursts in the uplink where signaling over head is a key issue, e.g., for IoT.

LBT: listen before talk. Generally, a non-scheduled, contention-based multiple access technology where a device monitors or senses a carrier to determine if it is available before transmitting over the carrier. Some LBT technologies utilize signaling such as a request to send (RTS) and a clear to send (CTS) to reserve the channel for a given duration of time.

D2D: device-to-device. Also point-to-point (P2P). Generally, D2D enables discovery of, and communication with nearby devices using a direct link between the devices (i.e., without passing through a base station, relay, or other node). D2D can enable mesh networks, and device-to-network relay functionality. Some examples of D2D technology include Bluetooth pairing, Wi-Fi Direct, Miracast, and LTE-D.

IAB: integrated access and backhaul. Some base stations may be configured as IAB nodes, where the wireless spectrum may be used both for access links (i e, wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

QoS: quality of service. Generally, the collective effect of service performances which determine the degree of satisfaction of a user of a service. QoS is characterized by the combined aspects of performance factors applicable to all services, such as: service operability performance; service accessibility performance; service retainability performance; service integrity performance; and other factors specific to each service.

SRS Resource Set: Sounding reference signal resource set. Generally, an SRS resource set contains a set of SRS resources transmitted by one UE. A UE may be configured with multiple resources, which may be grouped in an SRS resource set depending on the use case. The SRS resource including locations of SRS in the time and frequency domains in the resource grid.

slotOffset: Generally, an offset in number of slots between a triggering DCI and the actual transmission of an SRS resource set.

DETAILED DESCRIPTION EXAMPLES

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
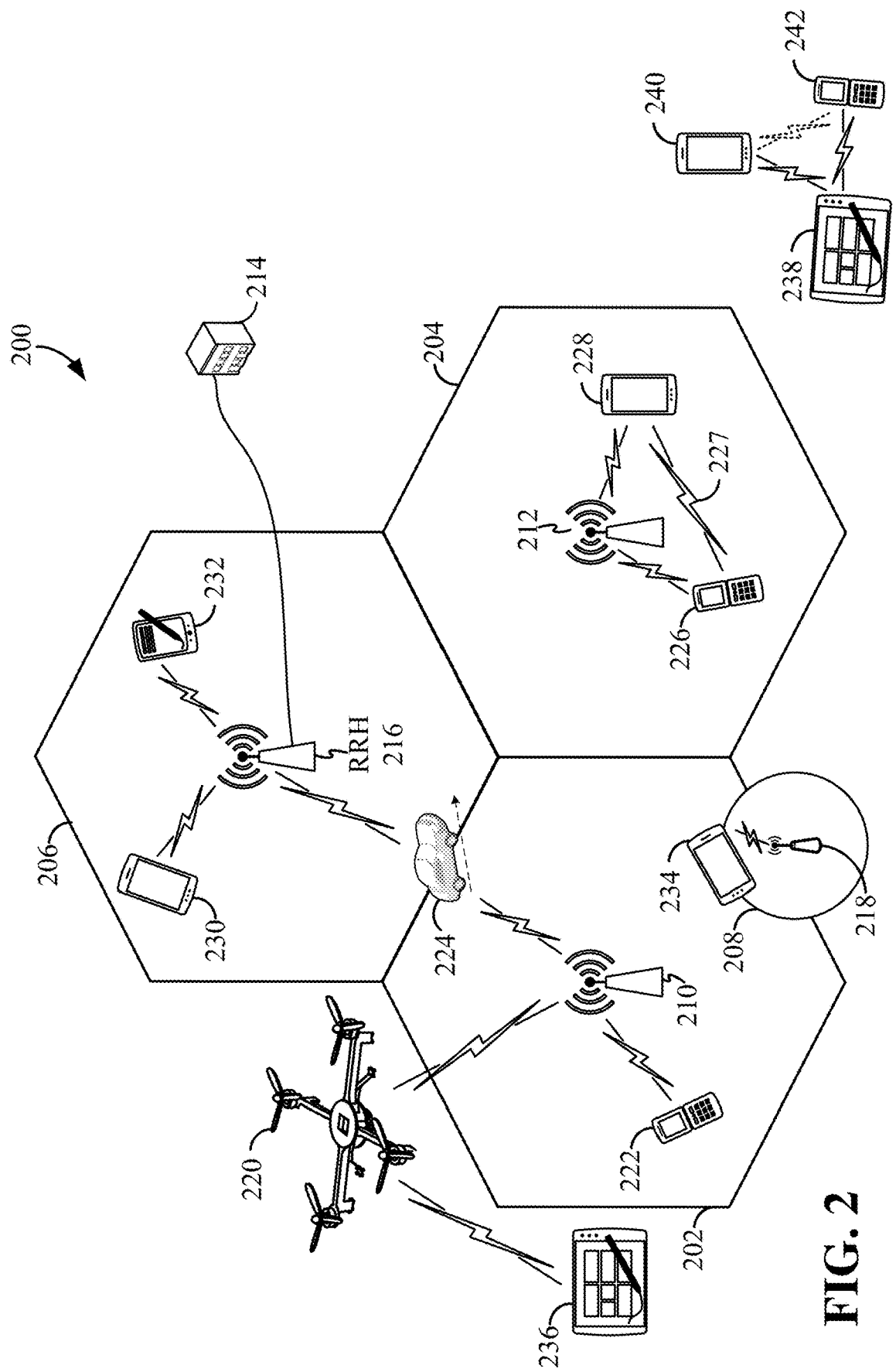
FIG. 2 is a conceptual illustration of an example of a radio access network according to some aspects.
Figure 3:
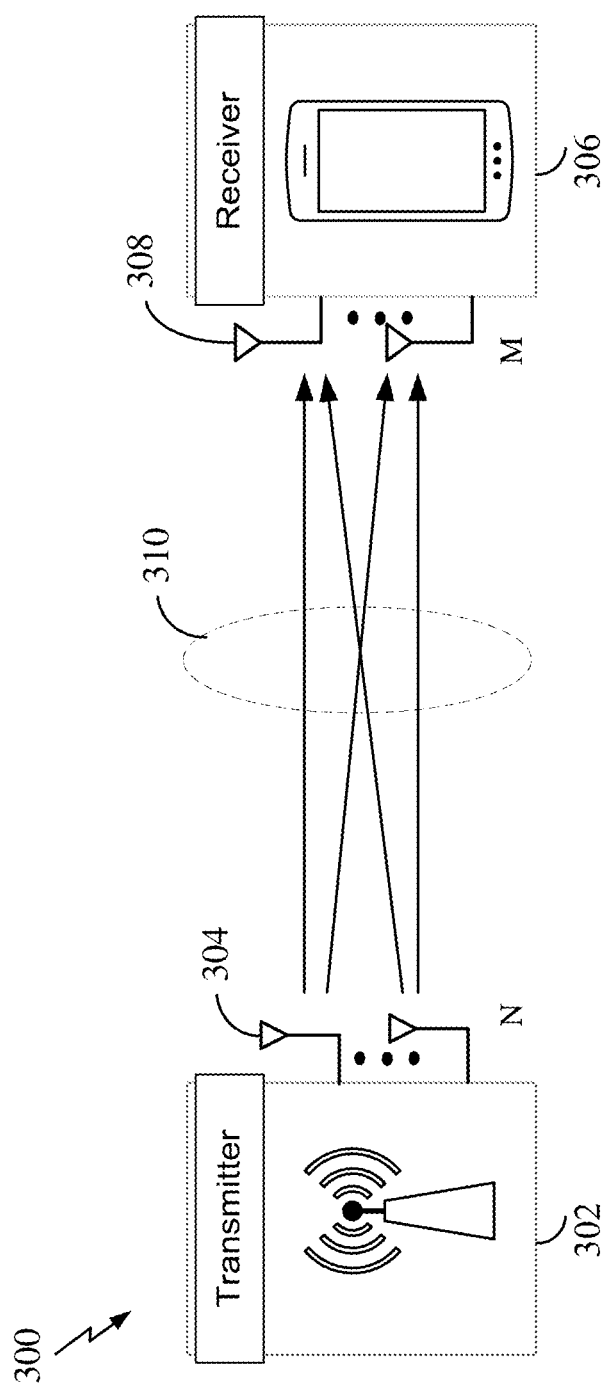
FIG. 3 is a block diagram illustrating a wireless communication system supporting multiple-input multiple-output (MIMO) communication.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
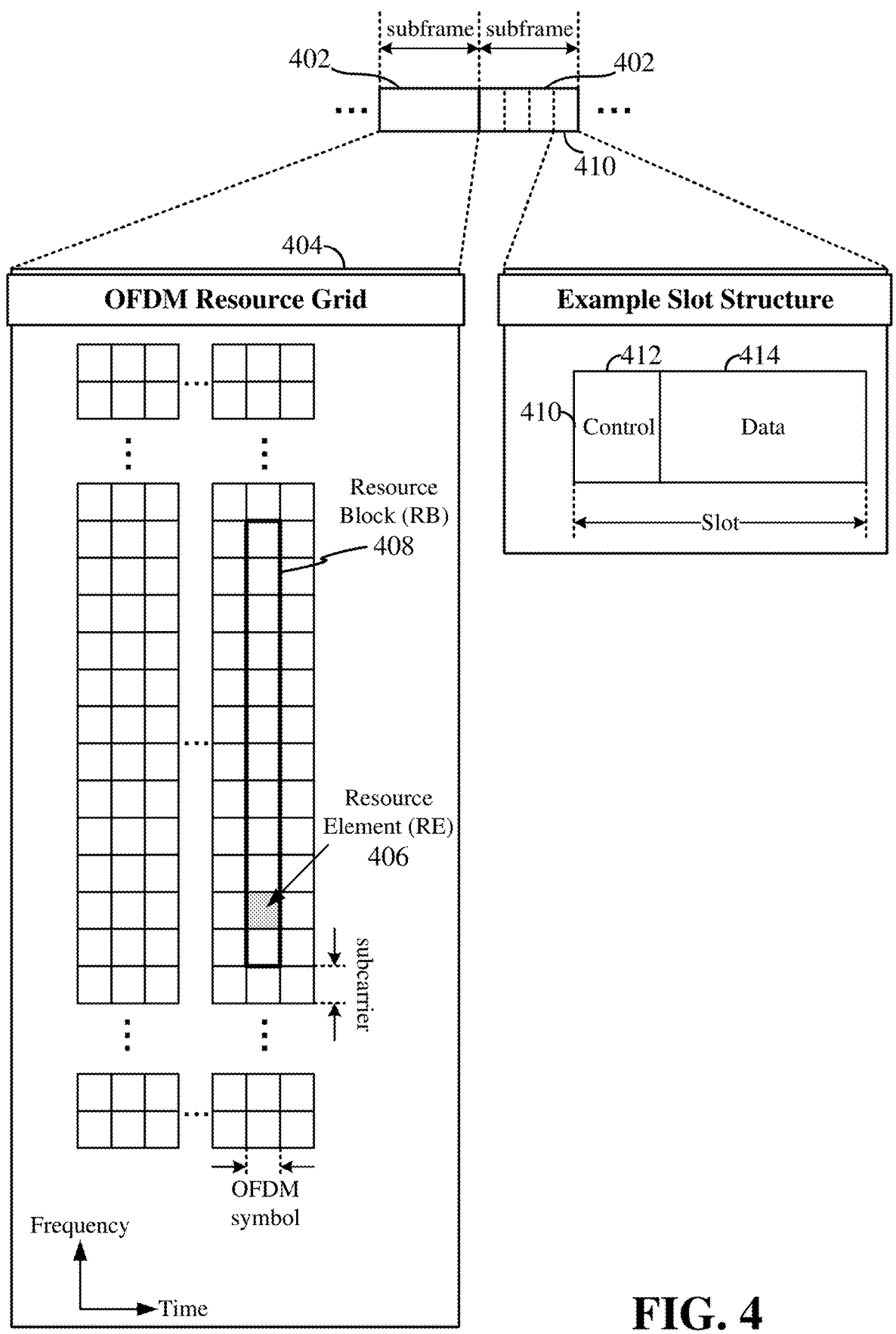
FIG. 4 is a schematic illustration of an organization of wireless resources in an air interface utilizing orthogonal frequency divisional multiplexing (OFDM) according to some embodiments.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions. Additionally, In an UL transmission, a transmitting device (e.g., a scheduled entity 106) may utilize one or more REs 406 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Transmissions may at times involve additional types of control signaling. As mentioned previously, an SRS resource set can contain a set of SRS resources. UEs and BSs may transmit SRS signaling. An SRS resource set may be transmitted in an aperiodic (i.e., DCI-signaled or triggered), a semi-persistent, or a periodic manner Additionally or alternatively, a UE may be configured with multiple SRS resources. A UE and BS may exchange SRS-related indications/transmissions for a variety of purposes in a variety of arrangements. SRS resources may be grouped in an SRS resource set depending on the use case such as antenna switching, codebook-based, non-codebook based, or beam management.

Figure 5:
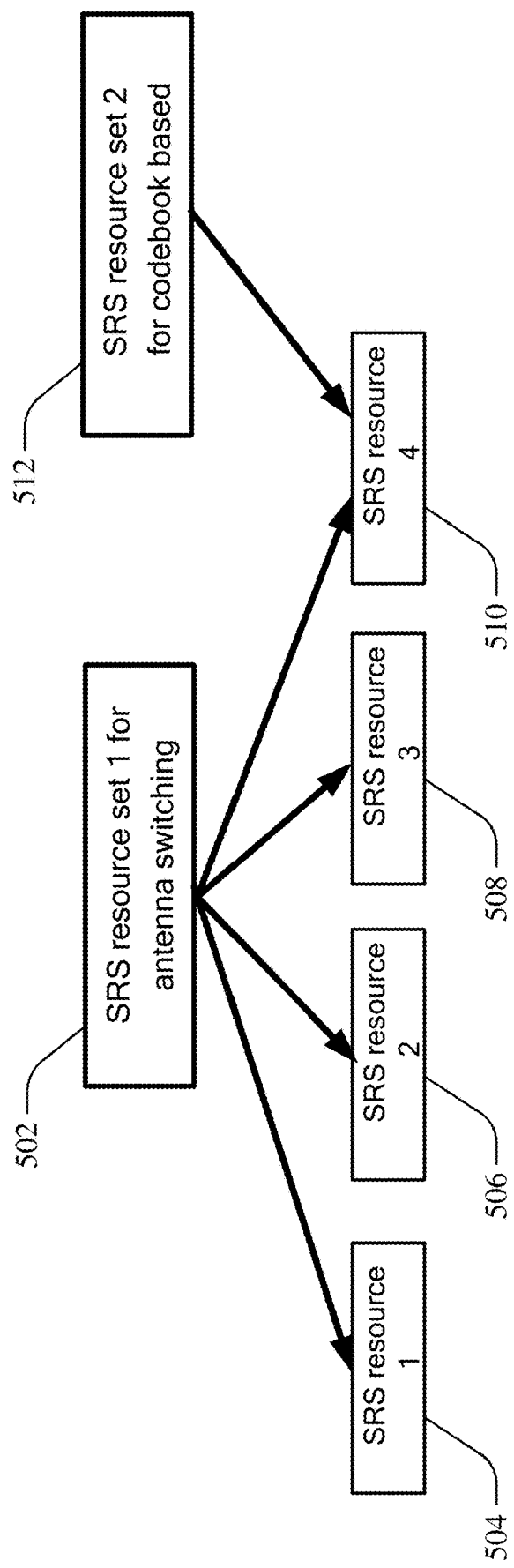
FIG. 5 illustrates a block diagram of an example of allocations of SRS resources for different SRS resource sets.

As an example of SRS resource sets comprised of one or more SRS resources, FIG. 5 illustrates a block diagram illustrating examples of how SRS resource sets may be constructed or arranged using one or more SRS resources. As may be seen in the figure, a first SRS resource set 502 for the use case of antenna switching may employ four SRS resources 1-4, which are indicated by reference numbers 504, 506, 508, and 510, respectively. In this particular example, this use case may be the 1T4R case known in the 3GPP specifications (e.g., 3GPP TS 38.214) where each resource set (e.g., 502) has four SRS Resources (504, 506, 508, and 510) that are transmitting at different symbols of different slots on different antennas. Of note, however, use case is merely exemplary and the present disclosure is applicable to any of the four use cases described above. In another illustrated example of a use case of codebook based SRS, a second SRS resource set 512 is shown to include the use of SRS resource 4 (i.e., 510).

For an A-SRS transmission, the aperiodic approach of transmission can vary and be implemented in multiple manners. As one example according to some aspects, an A-SRS transmission may include one or more bits (e.g., two (2) bits) or codepoints. In some deployments, a DL DCI or a UL DCI can be used to trigger a transmission of an SRS resource set. Each of or only some of an A-SRS resource set may be tagged with the values 1, or 2, or 3. These values can correspond to DCI codepoints 01, 10, and 11, respectively. A DCI codepoint of 00 indicates that there is no A-SRS transmission.

SRS transmission (such as an A-SRS) can be configured with one or more off-set values in varying approaches. As one example, an A-SRS set (also termed "SRS-Resource-Set" in the 3GPP specifications) can be configured via a radio resource control (RRC) with a slot offset value (i.e., "slotOffset"). The slot offset value may have a range of values (e.g., from a value of 0 to a value of 32). Other deployments may use other applicable to ranges either greater or less than this exemplary range of slot offset values. That is, offset values can take on a range of values and forms such that signaling and device operation relative to offset signaling can be optimized and/or utilized as desired.

An offset value can be configured to relay location information for another parameter of interest. In some deployments, an offset value can indicate a number of slots between a triggering DCI and actual transmission of the SRS-ResourceSet. If an offset value field is absent, a UE may be configured to apply no offset (i.e., a value "0"). As mentioned before, if an SRS resource set is selected by DCI, the slot offset is fixed. Yet in other deployments, as discussed herein, aspects enable and provide dynamic selection of one or more slot offset values Dynamic selection can enhance A-SRS transmission by allowing more flexibility (e.g., over a fixed slot offset after SRS resource set selection). In some aspects, embodiments enable and allow a base station or gNB to dynamically indicate an A-SRS slot offset within a DCI. Doing so, enables a receiving UE to receive fresh or continually updated reporting of slot offset values.

Figure 6:
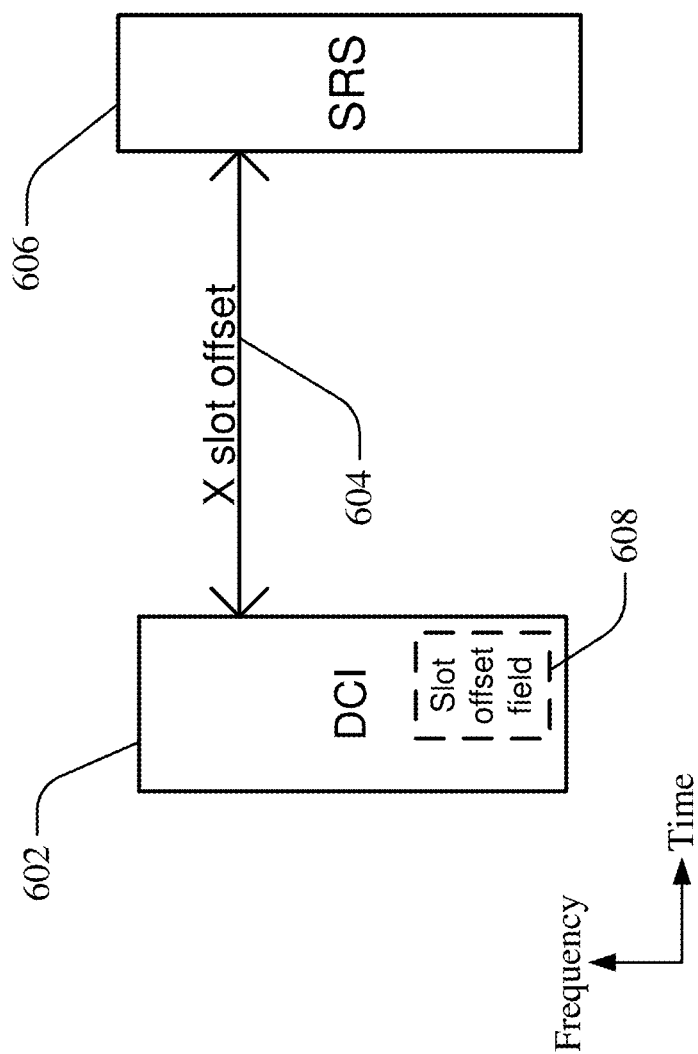
FIG. 6 illustrates a timing diagram illustrating a particular slot offset for transmission of an A-SRS.

As an example, FIG. 6 illustrates an exemplary timing/frequency diagram illustrating an example slot offset for A-SRS transmission. This sample deployment can allows a base station or gNB to dynamically indicate an A-SRS offset in the DCI. As illustrated, a DCI 602 can be transmitted by a base station or gNB. DCI 602 can include a variety of control signaling and can be flexibly configured. For example, the DCI may include a DL grant, a UL grant, and/or a group-common DCI configured for SRS power control and SRS switching (e.g., DCI format 2_3 with transmit power control (TPC)). Additionally or alternatively, the DCI 602 may include a particular field (shown in FIG. 6 as optional slot offset field 608) that provides a slot offset indication or value. A slot offset value can enables a UE receiving the DCI 602 to determine the slot offset (i.e., the number of slots of the offset). Additionally or alternatively, a UE receiving the DCI 602 can use a slot offset value to locate a slot offset from a list of predetermined slot offsets configured in the UE via RRC signaling (not shown).

As illustrated, the slot offset is a value (or some value corresponding to) a number of slots for an offset. In other words, an "X" number of slots as shown at 604 may correspond to a particular time. That is, the number of slots will correlate to a time that is dependent on a the particular timing and numerology for each slot (e.g., a 0.5 ms slot in a system where a subframe is defined to have a duration of 1 ms and there are two slots defined for a subframe based on the particular system numerology). The number of slots for the offset may be variable among different system configurations and at different times. Thus, the present slot offset indication is dynamic by being able to provide a fresh or updated slot offset value. A-SRS slot indication provided to DCI. After determining the slot offset 604, a UE may then transmit at least one SRS transmission 606 using the determined slot offset. A value "X" can indicate that the UE shall transmit the SRS transmission 606 an X number of slots after the slot in which it receives the DCI 602.

Concerning how a DCI communicates a slot offset, various alternatives are contemplated for many possible deployments. In one alternative, each SRS resource set may be configured by an RRC with a listing or list of slot offsets (i.e., a plurality or some number of different slot offsets). In one aspect, an RRC configuration configures a UE such that the listing or list of slot offsets is known or stored in the UE with each respective SRS resource set. The signaling that indicates which particular SRS resource set and slot offset in the list of slot offsets has been selected may be accomplished through associating the various codepoints transmittable in the DCI with respective offset values in the list of slot offset value, where each codepoint in the DCI is associated with a particular offset value in the list of slot offsets. As mentioned above, the codepoint may be 2 bits to indicate four different values in one example. The disclosure is not limited to this number of bits (i.e., codepoints) and more than 2 bits may be used to indicate a slot offset value for lists that have more than four values. In further aspects, an A-SRS trigger field in the DCI may be used to indicate which SRS resource set is being triggered by the base station or gNB.

In another alternative, the indication may be configured such that a single slot offset list is configured for all of the SRS resource sets. In this case, each codepoint in the DCI may be associated with a particular offset value in the slot offset value list.

With regard to the manner or means for effectuating the communication of the selected slot offset values to the UE with a DCI, numerous alternatives or options are contemplated. In general, the slot offset indication using bits or codepoints are effectuated by placing the slot offset indication in a field within the DCI to indicate the particular slot offset. In a first option, an established or existing field in the DCI may be utilized (e.g., a reused existing field) to carry the indication information. For example, a time-domain resource allocation (TDRA) or a frequency domain resource allocation (FDRA) existing in the UL or DL grant may be used (or repurposed) to indicate the slot offset.

Furthermore, in some other deployments the slot offset indication may be accomplished using signaling besides the use of a DCI (i.e., some other dedicated or repurposed layer 1 or layer 2 signaling on the wireless interface). Of further note, the slot offset indication could be any one of various types such as an initial signaling indication, a one-time signaling that is followed by triggered updates, or a periodic update that is based on current operations or conditions or whenever there is change in currents operations or conditions.

Figure 7:
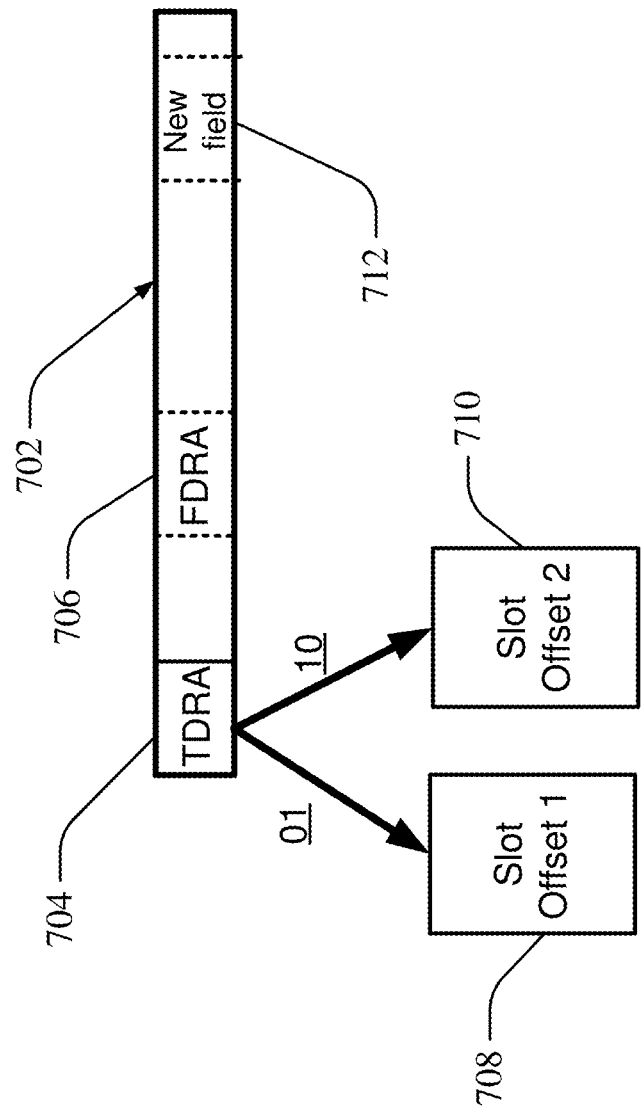
FIG. 7 illustrates fields in a UL or DL grant in a DCI and indications of slot offset values therein.

As an example, FIG. 7 illustrates a UL or DL grant in a DCI 702. The DCI 702 can further include a slot offset indication that is within a reused existing field. In this example, either a TDRA field 704 or an FDRA field 706 could be utilized, but the disclosure is not limited to just these two fields for slot indication. In the example of the TDRA 704, a value of 01, for example, might indicate a first slot offset value 708, whereas a value of 10 might indicate a second slot offset value 710.

According to another second option for effectuating the communication of the list of slot offsets, a new or added DCI field may be utilized in the DCI to indicate the slot offset value as shown at 712 in FIG. 7, for example. This option may be more appropriate when the A-SRS transmission is triggered by a group common DCI (e.g., DCI format 2-3, TPC for SRS). In this case, the new DCI field may further be configured to be UE-specific; i.e., different UEs may have separate fields in the DCI to indicate the slot offset. Of yet further note, the presence of this field in the DCI may be RRC configured. In addition, if the offset list is configured, but the SRS is triggered by a DCI format that does not have the slot-offset indication (i.e., either by reinterpreting an existing field (i.e., the first option above) or by adding a new field (i.e., the second option above), then the UE may always use an offset value residing in a predetermined offset value location, such as the first offset value or the last offset value in the list, as merely two examples but not limited to such. In a further example, the slot offset field could be configured in the DL DCI but not in the UL DCI, or vice versa.

Additionally, in certain aspects, given the above various deployment options, there may be constraints on DCI. Constraints may relate to DCI size (i.e., the number of bits). Size constrains may be especially involve a UL-DCI, where the DCI field may be used to also trigger A-CSI report transmission. To limit the number of bits used for SRS and CSI requests in DCI, various aspects enable and provide an upper bound on the total number of bits used to indicate CSI requests and/or SRS requests (e.g., 8 bit limit or 10 bit limit). In addition, a further second upper bound may be imposed for each SRS and CSI request (e.g., a 6 bit limit for each request).

Figure 8:
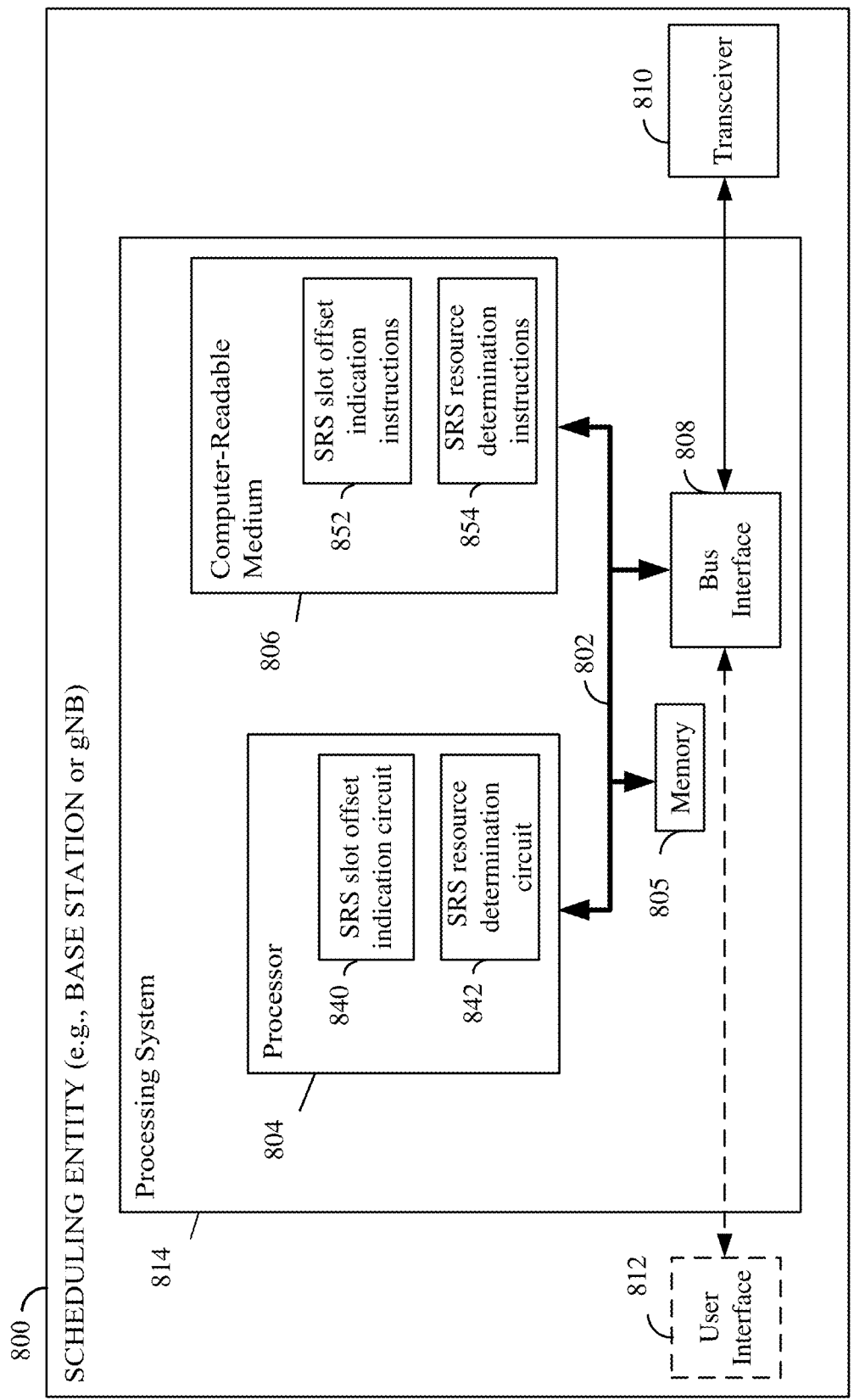
FIG. 8 is a block diagram conceptually illustrating an example of a hardware implementation for a scheduling entity according to some aspects of the disclosure.

FIG. 8 is a block diagram illustrating an example of a hardware implementation for a scheduling entity, base station, or gNB 800 employing a processing system 814. For example, the scheduling entity 800 may be a base station or gNB as illustrated in any one or more of FIGS. 1, 2, and/or 3. In another example, the scheduling entity 800 may be a UE as illustrated in any one or more of FIGS. 1, 2, and/or 3 acting as a scheduling entity.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the processes and procedures described herein.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided. Of course, such a user interface 812 is optional, and may be omitted in some examples, such as a base station.

In some aspects of the disclosure, the processor 804 may include SRS slot offset indication circuitry 840 configured for various functions, including, for example, providing the dynamic SRS slot offset as discussed above, and other slot indication processes and methods as will be discussed in further detail with respect to FIG. 10. In some other aspects of the disclosure, the processor 804 may include SRS resource determination circuitry 842 configured for various functions, including, for example, determining the SRS resources or SRS resource sets and parameters associated therewith as discussed above, and also in connection with the processes and methods discussed below in connection with FIG. 10.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include SRS slot offset indication software or instructions 852 configured for various functions, including, for example, providing the dynamic SRS slot offset as discussed above and also in connection with FIG. 10 below. In some further aspects of the disclosure, the processor 804 may include SRS resource determination instructions or software 854 configured for various functions, including, for example, determining the SRS resources and parameters associated therewith as discussed above and also in connection with FIG. 10.

Figure 9:
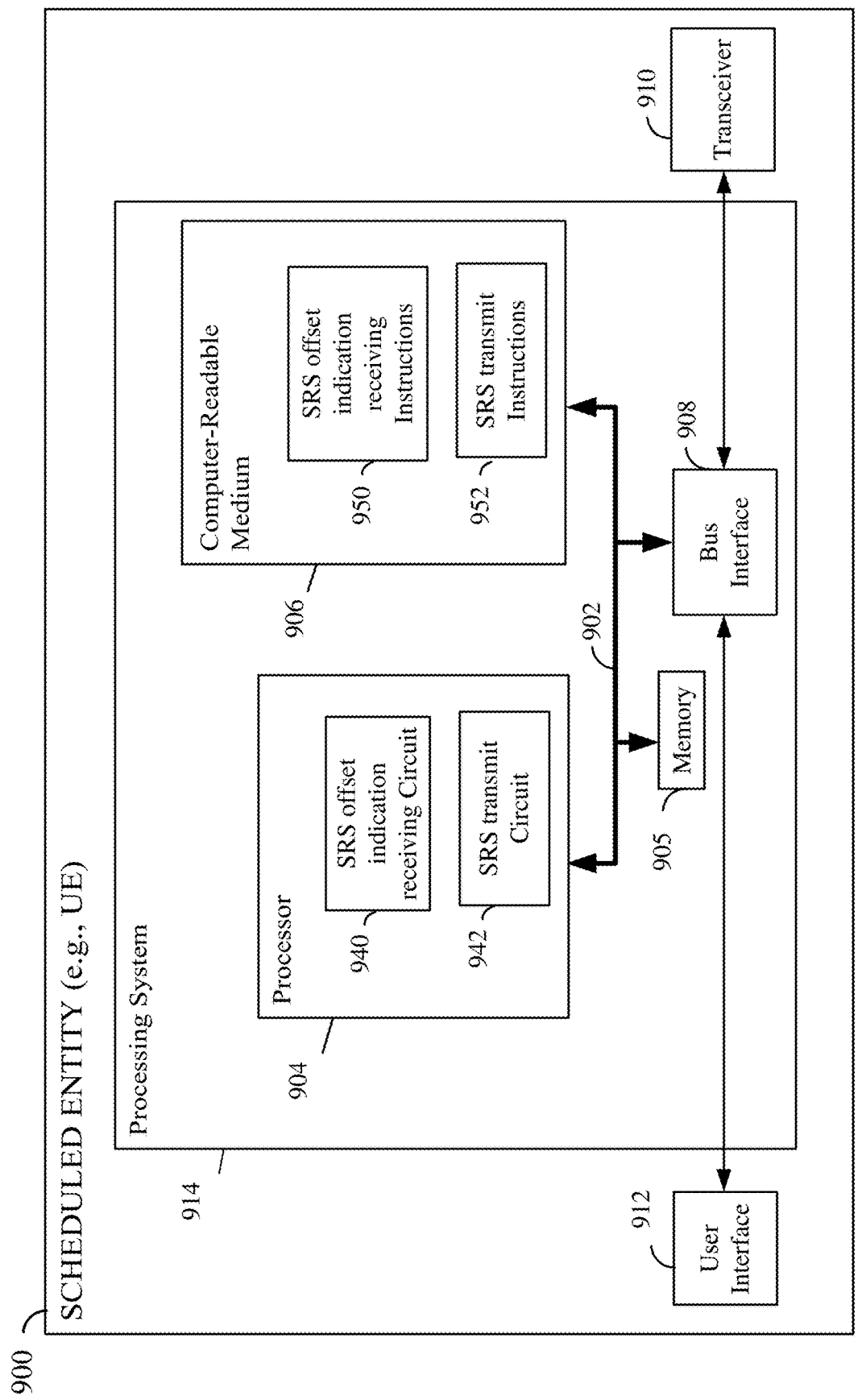
FIG. 9 is a block diagram conceptually illustrating an example of a hardware implementation for a scheduled entity according to some aspects of the disclosure.

FIG. 9 is a conceptual diagram illustrating an example of a hardware implementation for an exemplary scheduled entity 900 employing a processing system 914. In accordance with various aspects of the disclosure, an element, or any portion of an element, or any combination of elements may be implemented with a processing system 914 that includes one or more processors 904. For example, the scheduled entity 900 may be a user equipment (UE) as illustrated in any one or more of FIGS. 1, 2, and/or 3.

The processing system 914 may be substantially the same as the processing system 814 illustrated in FIG. 8, including a bus interface 908, a bus 902, memory 905, a processor 904, and a computer-readable medium 906. Furthermore, the scheduled entity 900 may include a user interface 912 and a transceiver 910 substantially similar to those described above in FIG. 8. That is, the processor 904, as utilized in a scheduled entity 900, may be used to implement any one or more of the processes described herein.

In some aspects of the disclosure, the processor 904 may include SRS offset indication circuitry 940 configured for various functions, including, for example, determining the slot offset value for SRS transmissions by the scheduled entity 900 as discussed above, as well as in connection with FIG. 11 to be discussed below. In other aspects, the processor 904 may include SRS transmit circuitry 942 configured for various functions, including, for example, transmitting SRS transmissions by the scheduled entity 900 as discussed above, as well as in connection with FIG. 11 to be discussed below, including transmissions based on the received or determined SRS slot offset values as discussed above, as well as in connection with FIG. 11 to be discussed below.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, and/or 3, and utilizing, for example, the processes and/or algorithms described herein.

Figure 10:
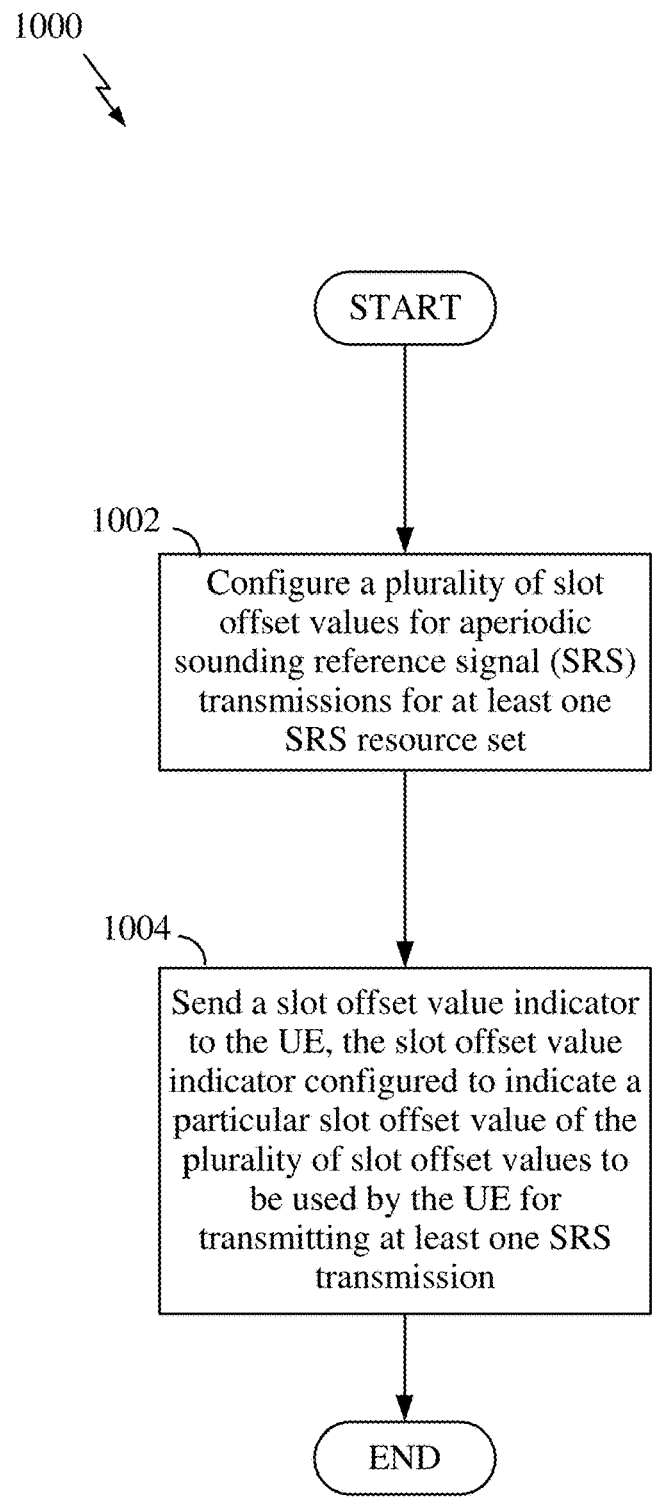
FIG. 10 is a flow chart illustrating an exemplary process for indicating a slot offset value to UE according to some aspects of the disclosure.

FIG. 10 is a flow chart illustrating an exemplary method 1000 for dynamically providing an A-SRS slot offset value indication in accordance with some aspects of the present disclosure. As described below, some or all illustrated features may be omitted in a particular implementation within the scope of the present disclosure, and some illustrated features may not be required for implementation of all embodiments. In some examples, the method 1000 may be carried out by the scheduling entity 800 or a gNB as illustrated in FIG. 8. In some examples, the method 1000 may be carried out by any suitable apparatus or means for carrying out the functions or algorithm described below.

At block 1002, method 1000 includes configuring or determining a plurality of slot offset values for aperiodic sounding reference signal (SRS) transmissions for at least one SRS resource set. In a deployment, the slot offset values are usable by a user equipment (UE) for setting the slot offset between the DCI reception and the A-SRS transmission as discussed above with respect to FIG. 6 for example. It is noted that the configuring may be implemented in a scheduling entity, base station or gNB including the use of RRC signaling to configure the UE to be configured with the plurality or list of the slot offset values. Furthermore, method 1000 includes sending a slot offset value indicator to the UE, the slot offset value indicator configured to indicate a particular slot offset value of the plurality of slot offset values to be used by the UE for transmitting at least one SRS transmission as shown in block 1004. In further aspects, it is understood that the UE, once configured and receiving the slot offset value indicator, in turn will transmit the at least one SRS transmission using the slot offset indicated (e.g., transmission of the SRS an "X" number of slots, as indicated, after the receipt of the sent offset value indicator, which may be sent in a DCI as discussed earlier with reference to FIG. 7. Accordingly, method 1000 may further include receiving or monitoring the SRS transmission sent by the UE, which was sent using the indicated slot offset value.

According to further aspects, method 1000 may include sending configuration information for a plurality of SRS resource sets. One or each of the plurality of SRS resource sets may be configured or associated with a respective plurality of slot offset values. Additionally, a slot offset value indicator can be further configured to include a plurality of codepoint values. A codepoint value can be associated with a corresponding offset value (e.g., in a respective plurality of slot offset values).

In further aspects, method 1000 may include transmitting a trigger signal with a slot offset value indicator to the UE. A trigger signal can be configured to indicate a particular SRS resource set of the plurality of SRS resource sets that is to be utilized by the UE. In another aspect, a plurality of SRS resource sets may utilized where the plurality of slot offset values is configured for each of the plurality of SRS resource sets and the slot offset value indicator further includes a plurality of codepoint values. One or more of the codepoint values can be associated with a corresponding offset value in the plurality of slot offset values.

In yet another aspect of method 1000, the slot offset value indicator comprises at least one field in a downlink control indicator (DCI) transmitted to the UE. In an example, the at least one field comprises an existing field in the DCI that provides the slot offset value indicator, as was discussed in connection with FIG. 7, such as one of a time-domain resource allocation (TDRA) or a frequency domain resource allocation (FDRA) in at least one of an uplink (UL) grant or a downlink (DL) grant in the DCI. In an alternative aspect, the at least one field may comprise at least one added field in the DCI that provides the slot offset value indicator. Furthermore, the at least one field may include a plurality of added fields in the DCI, wherein each added field of the plurality of added field provides a portion of the slot offset value indicator and is configured to be specific to a respective UE.

In yet another aspect, a gNB may configure a UE to utilize a predetermined slot offset value of the plurality of slot offset values. A predetermined slot offset value can be used to transmitting at least one SRS transmission when the at least one SRS transmission is triggered by downlink signaling that does not include a slot offset value indicator. In a further example, the predetermined slot offset value comprises one of a first slot offset value in a listing of the plurality of slot offset values or a last slot offset value in the listing of the plurality of slot offset values.

In another example, method 1000 may include transmitting the slot offset value indicator within a downlink control indicator (DCI). A DCI can be configured to include a trigger signal to the UE to trigger transmission of aperiodic channel status information (A-CSI) by the UE and including a CSI request, where a combined number of bits in the DCI for transmitting the slot offset value indicator and the CSI request is limited by a first predetermined number of bits. In a further example, method 1000 may include the configuration where the number of bits being used for each of the slot offset value indicator and the CSI request are each limited by a second predetermined number of bits.

Figure 11:
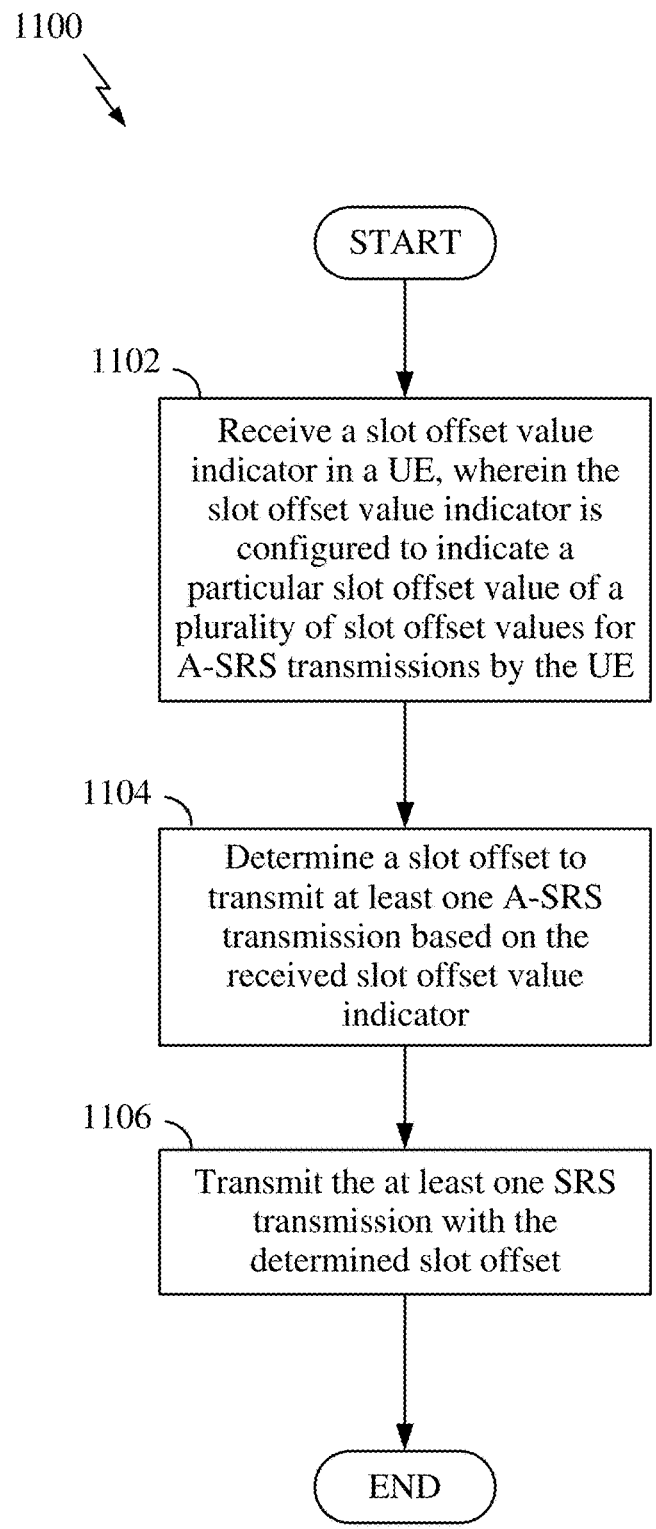
FIG. 11 is a flow chart illustrating an exemplary process for receiving a slot offset value in a UE according to some aspects of the disclosure.

FIG. 11 is a flow chart illustrating an exemplary method 1100 for utilizing dynamically indicated slot offset values in a UE or scheduled entity in accordance with some aspects of the present disclosure. As described below, some or all illustrated features may be omitted in a particular implementation within the scope of the present disclosure, and some illustrated features may not be required for implementation of all embodiments. In some examples, the method 1100 may be carried out by the scheduled entity or UE 900 illustrated in FIG. 9. In some examples, the process 900 may be carried out by any suitable apparatus or means for carrying out the functions or algorithm described below.

At block 1102, a UE may receive a slot offset value indicator. A slot offset value indicator can be configured to indicate a particular slot offset value of a plurality of slot offset values for A-SRS transmissions by the UE. Further, method 1100 includes determining a slot offset to transmit at least one A-SRS transmission based on the received slot offset value indicator as shown at block 1104. Finally, illustrated method 1100 includes transmitting the at least one aperiodic A-SRS transmission with a slot offset value the determined slot offset based on the received slot offset value indicator as illustrated in block 1106.

In other aspects, the method 1100 may include utilizing an indication of a plurality of SRS resource sets. Each of the plurality of SRS resource sets (or some portion thereof) can be associated with a respective plurality of slot offset values. Additionally, the slot offset value indicator is further configured to include a plurality of codepoint values, where each codepoint value is associated with a corresponding offset value in the respective plurality of slot offset values.

According to further aspects, method 1100 may include receiving a trigger signal with the slot offset value indicator in the UE. A trigger signal can be configured to indicate a particular SRS resource set of the plurality of SRS resource sets that is to be utilized by the UE. In another aspect, method 1100 may include receiving configuration information of a plurality of SRS resource sets where the plurality of slot offset values is configured for each of the plurality of SRS resource sets, and the slot offset value indicator is further configured to include a plurality of codepoint values, where each codepoint value is associated with a corresponding offset value in the plurality of slot offset values.

In other aspects, method 1100 include the slot offset value indicator comprising at least one field in a downlink control indicator (DCI) received in the UE. In one example, the at least one field comprises an existing field in the DCI that provides the slot offset value indicator. Further, the existing field comprises one of a time-domain resource allocation (TDRA) or a frequency domain resource allocation (FDRA) in at least one of an uplink (UL) grant or a downlink (DL) grant in the DCI. In another example, the at least one field comprises at least one added field in the DCI that provide the slot offset value indicator. Here, the at least one field comprises a plurality of added fields in the DCI, where each added field of the plurality of added field provides a portion of the slot offset value indicator and is configured to be specific to a respective UE.

In other aspects, method 1100 includes configuring the UE, via received radio resource control (RRC) signaling, to utilize a predetermined slot offset value of the plurality of slot offset values for transmitting the at least one SRS transmission when the at least one SRS transmission is triggered by downlink signaling that does not include a slot offset value indicator. The predetermined slot offset value may include one of a first slot offset value in a listing of the plurality of slot offset values or a last slot offset value in the listing of the plurality of slot offset values.

In further aspects, method 1100 includes receiving the slot offset value indicator within a downlink control indicator (DCI), where the DCI is configured to include a trigger signal to the UE to trigger transmission of aperiodic channel status information (A-CSI) by the UE and including a CSI request. In an example, a combined number of bits in the DCI for transmitting the slot offset value indicator and the CSI request is limited by a first predetermined number of bits. In another example, a number of bits used for each of the slot offset value indicator and the CSI request are each limited by a second predetermined number of bits.

Several aspects of a wireless communication network have been presented with reference to various exemplary implementations. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

Of further note, the present disclosure may include the following further examples.

In an example 1, a method, apparatus, and non-transitory computer-readable medium may provide for configuring a plurality of slot offset values for aperiodic sounding reference signal (SRS) transmissions for at least one SRS resource set; and sending a slot offset value indicator to a user equipment (UE), the slot offset value indicator configured to indicate a particular slot offset value of the plurality of slot offset values to be used by the UE for transmitting at least one SRS transmission.

In an example 2, the method, apparatus, and non-transitory computer-readable medium of example 1 further include receiving the at least one SRS transmission using the slot offset value indicator from the UE.

In an example 3, the method, apparatus, and non-transitory computer-readable medium of any of examples 1 to 2 further include sending configuration information for a plurality of SRS resource sets, wherein each of the plurality of SRS resource sets is configured with a respective plurality of slot offset values; and further configuring the slot offset value indicator to include a plurality of codepoint values, wherein each codepoint value is associated with a corresponding offset value in the respective plurality of slot offset values.

In an example 4, the method, apparatus, and non-transitory computer-readable medium of any of examples 1 to 3 further include transmitting a trigger signal with the slot offset value indicator to the UE, wherein the trigger signal is configured to indicate a particular SRS resource set of the plurality of SRS resource sets that is to be utilized by the UE.

In an example 5, the method, apparatus, and non-transitory computer-readable medium of any of examples 1 to 4 further include sending configuration information for a plurality of SRS resource sets, wherein the plurality of slot offset values is configured for each of the plurality of SRS resource sets; and the slot offset value indicator further configured to include a plurality of codepoint values, wherein each codepoint value is associated with a corresponding offset value in the plurality of slot offset values.

In an example 6, the method, apparatus, and non-transitory computer-readable medium of any of examples 1 to 5 further include configuring the slot offset value indicator to comprise at least one field in a downlink control indicator (DCI) transmitted to the UE.

In an example 7, the method, apparatus, and non-transitory computer-readable medium of any of examples 1 to 6 further include the at least one field to comprise an existing field in the DCI that provides the slot offset value indicator.

In an example 8, the method, apparatus, and non-transitory computer-readable medium of any of examples 1 to 7 further include the existing field comprising one of a time-domain resource allocation (TDRA) or a frequency domain resource allocation (FDRA) in at least one of an uplink (UL) grant or a downlink (DL) grant in the DCI.

In an example 9, the method, apparatus, and non-transitory computer-readable medium of any of examples 1 to 8 further include at least one field comprising at least one added field in the DCI that provides the slot offset value indicator.

In an example 10, the method, apparatus, and non-transitory computer-readable medium of any of examples 1 to 9 further include at least one field comprising a plurality of added fields in the DCI, wherein each added field of the plurality of added field provides a portion of the slot offset value indicator and is configured to be specific to a respective UE.

In an example 11, the method, apparatus, and non-transitory computer-readable medium of any of examples 1 to 10 further include configuring a UE to utilize a predetermined slot offset value of the plurality of slot offset values for transmitting the at least one SRS transmission when the at least one SRS transmission is triggered by downlink signaling that does not include a slot offset value indicator.

In an example 12, the method, apparatus, and non-transitory computer-readable medium of any of examples 1 to 11 further include a predetermined slot offset value comprising one of a first slot offset value in a listing of the plurality of slot offset values or a last slot offset value in the listing of the plurality of slot offset values.

In an example 13, the method, apparatus, and non-transitory computer-readable medium of any of examples 1 to 12 further include transmitting the slot offset value indicator within a downlink control indicator (DCI), wherein the DCI is configured to include a trigger signal to the UE to trigger transmission of aperiodic channel status information (A-CSI) by the UE and including a CSI request, and wherein a combined number of bits in the DCI for transmitting the slot offset value indicator and the CSI request is limited by a first predetermined number of bits.

In an example 14, the method, apparatus, and non-transitory computer-readable medium of any of examples 1 to 13 further include a number of bits used for each of the slot offset value indicator and a CSI request each limited by a second predetermined number of bits.

In an example 15, a method, apparatus, and non-transitory computer-readable medium may provide for receiving a slot offset value indicator in a UE, wherein the slot offset value indicator is configured to indicate a particular slot offset value of a plurality of slot offset values for aperiodic sounding reference signal (A-SRS) transmissions by the UE; determining a slot offset to transmit at least one A-SRS transmission based on the received slot offset value indicator; and transmitting the at least one A-SRS transmission with the determined slot offset.

In an example 16, the method, apparatus, and non-transitory computer-readable medium of example 15 further include receiving configuration information for a plurality of SRS resource sets, wherein each of the plurality of SRS resource sets is configured with a respective plurality of slot offset values; and the slot offset value indicator further configured to include a plurality of codepoint values, wherein each codepoint value is associated with a corresponding offset value in the respective plurality of slot offset values.

In an example 17, the method, apparatus, and non-transitory computer-readable medium of examples 15 to 16 further include receiving a trigger signal with the slot offset value indicator to the UE, wherein the trigger signal is configured to indicate a particular SRS resource set of the plurality of SRS resource sets that is to be utilized by the UE.

In an example 18, the method, apparatus, and non-transitory computer-readable medium of examples 15 to 17 further include receiving a trigger signal with the slot offset value indicator to the UE, wherein the trigger signal is configured to indicate a particular SRS resource set of the plurality of SRS resource sets that is to be utilized by the UE.

In an example 19, the method, apparatus, and non-transitory computer-readable medium of examples 15 to 18 further include receiving configuration information for a plurality of SRS resource sets, wherein the plurality of slot offset values is configured for each of the plurality of SRS resource sets; and further configuring the slot offset value indicator to include a plurality of codepoint values, wherein each codepoint value is associated with a corresponding offset value in the plurality of slot offset values.

In an example 20, the method, apparatus, and non-transitory computer-readable medium of examples 15 to 19 further include the slot offset value indicator comprising at least one field in a downlink control indicator (DCI) received in the UE.

In an example 21, the method, apparatus, and non-transitory computer-readable medium of examples 15 to 20 further include the at least one field comprising an existing field in the DCI that provides the slot offset value indicator.

In an example 22, the method, apparatus, and non-transitory computer-readable medium of examples 15 to 21 further include the existing field comprising one of a time-domain resource allocation (TDRA) or a frequency domain resource allocation (FDRA) in at least one of an uplink (UL) grant or a downlink (DL) grant in the DCI.

In an example 23, the method, apparatus, and non-transitory computer-readable medium of examples 15 to 22 further include the at least one field comprising at least one added field in the DCI that provide the slot offset value indicator.

In an example 24, the method, apparatus, and non-transitory computer-readable medium of examples 15 to 23 further include the at least one field comprising a plurality of added fields in the DCI, wherein each added field of the plurality of added fields provides the slot offset value indicator and is configured to be specific to a respective UE.

In an example 25, the method, apparatus, and non-transitory computer-readable medium of examples 15 to 24 further include configuring the UE, using received radio resource control (RRC) signaling, to utilize a predetermined slot offset value of the plurality of slot offset values for transmitting the at least one A-SRS transmission when the at least one SRS transmission is triggered by downlink signaling that does not include a slot offset value indicator.

In an example 26, the method, apparatus, and non-transitory computer-readable medium of examples 15 to 25 further include the predetermined slot offset value comprising one of a first slot offset value in a listing of the plurality of slot offset values or a last slot offset value in the listing of the plurality of slot offset values.

In an example 27, the method, apparatus, and non-transitory computer-readable medium of examples 15 to 26 further include receiving the slot offset value indicator within a downlink control indicator (DCI), wherein the DCI is configured to include a trigger signal to the UE to trigger transmission of aperiodic channel status information (A-CSI) by the UE and including a CSI request; and a combined number of bits in the DCI for transmitting the slot offset value indicator and the CSI request limited by a first predetermined number of bits.

In an example 28, the method, apparatus, and non-transitory computer-readable medium of examples 15 to 27 further include a number of bits used for each of the slot offset value indicator and the CSI request each limited by a second predetermined number of bits.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication, comprising:
sending a radio resource control message comprising configuration information of a plurality of sounding reference signal (SRS) resource sets, wherein each of the plurality of SRS resource sets is configured with a plurality of slot offset values for aperiodic SRS transmissions using at least one SRS resource set of the plurality of SRS resource sets; and
sending a downlink control indicator (DCI) to a user equipment (UE), the DCI comprising a first field that comprises a trigger signal, a time-domain resource allocation TDRA) field, and a second field that is separate from the first field and the TDRA field, and the second field comprises a slot offset value indicator, the slot offset value indicator configured to indicate a particular slot offset value of the plurality of slot offset values for transmitting at least one aperiodic SRS transmission, the trigger signal configured to indicate a particular SRS resource set of the plurality of SRS resource sets.

2. The method of claim 1, further comprising:
receiving the at least one aperiodic SRS transmission in a slot based on the slot offset value indicator.

3. The method of claim 1, wherein the slot offset value indicator is further configured to include a plurality of codepoint values, wherein each codepoint value is associated with a corresponding offset value in the plurality of slot offset values.

4. The method of claim 1, wherein the DCI comprises at least one field corresponding to the slot offset value indicator.

5. The method of claim 4, wherein the at least one field comprises a plurality of UE-specific fields in the DCI, wherein each one of the plurality of UE-specific fields provides a slot offset value to a different UE.

6. The method of claim 1, further comprising:
configuring the UE to utilize a predetermined slot offset value of the plurality of slot offset values for transmitting the at least one aperiodic SRS transmission in response to the at least one aperiodic SRS transmission being triggered by downlink signaling that does not include the slot offset value indicator.

7. The method of claim 1,
wherein the DCI is configured to trigger transmission of aperiodic channel status information (A-CSI) by the UE and including a CSI request; and
wherein a combined number of bits in the DCI for transmitting the slot offset value indicator and the CSI request is limited by a first predetermined number of bits.

8. An apparatus for wireless communication, comprising:
one or more processors; and
one or more memories coupled to the one or more processors,
wherein the one or more processors are configured to:
send a radio resource control message comprising configuration information of a plurality of SRS resource sets, wherein each of the plurality of sounding reference signal (SRS) resource sets is configured with a plurality of slot offset values for aperiodic SRS transmissions using at least one SRS resource set of the plurality of SRS resource sets; and
send a downlink control indicator (DCI) to a user equipment (UE), the DCI comprising a first field that comprises a trigger signal, a time-domain resource allocation (TDRA) field, and a second field that is separate from the first field and the TDRA field, and the second field comprises a slot offset value indicator, the slot offset value indicator configured to indicate a particular slot offset value of the plurality of slot offset values for transmitting at least one aperiodic SRS transmission, the trigger signal configured to indicate a particular SRS resource set of the plurality of SRS resource sets.

9. The apparatus of claim 8, wherein the one or more processors are further configured to:
receive the at least one aperiodic SRS transmission in a slot based on the slot offset value indicator.

10. The apparatus of claim 8, wherein the slot offset value indicator is further configured to include a plurality of codepoint values, wherein each codepoint value is associated with a corresponding offset value in the plurality of slot offset values.

11. The apparatus of claim 8, wherein the DCI comprises at least one field corresponding to the slot offset value indicator.

12. The apparatus of claim 11, wherein the at least one field comprises a plurality of UE-specific fields in the DCI, wherein each one of the plurality of UE-specific fields provides a slot offset value indicator to a different UE.

13. The apparatus of claim 8, wherein the one or more processors are further configured to:
configure the UE to utilize a predetermined slot offset value of the plurality of slot offset values for transmitting the at least one aperiodic SRS transmission in response to the at least one aperiodic SRS transmission being triggered by downlink signaling that does not include the slot offset value indicator.

14. The apparatus of claim 8, wherein the DCI is configured to trigger transmission of aperiodic channel status information (A-CSI) by the UE and including a CSI request; and wherein a combined number of bits in the DCI for transmitting the slot offset value indicator and the CSI request is limited by a first predetermined number of bits.

15. A method of wireless communication at a user equipment (UE), comprising:
receiving a radio control message comprising configuration information of a plurality of sounding reference signal (SRS) resource sets, wherein each of the plurality of SRS resource sets is configured with a plurality of slot offset values for aperiodic sounding reference signal (A-SRS) transmissions using at least one SRS resource set of the plurality of SRS resource sets;
receiving, at the UE, a download control indicator (DCI) comprising a first field that comprises a trigger signal, a time-domain resource allocation (TDRA) field, and a second field that is separate from the first field and the TDRA field, and the second field comprises a slot offset value indicator, wherein the slot offset value indicator is configured to indicate a particular slot offset value of the plurality of slot offset values for A-SRS transmissions by the UE, and the trigger signal is configured to indicate a particular SRS resource set of the plurality of SRS resource sets;
determining a slot offset to transmit at least one A-SRS transmission based on the slot offset value indicator; and
transmitting the at least one A-SRS transmission with the determined slot offset and the particular SRS resource set.

16. The method of claim 15, wherein the slot offset value indicator is further configured to include a plurality of codepoint values, wherein each codepoint value is associated with a corresponding offset value in the respective plurality of slot offset values.

17. The method of claim 15, wherein the DCI comprises at least one field corresponding to the slot offset value indicator.

18. The method of claim 17, wherein the at least one field comprises a plurality of UE-specific fields in the DCI, wherein each one of the plurality of UE-specific fields provides a slot offset value to a different UE.

19. The method of claim 15, further comprising:
configuring the UE, using received radio resource control (RRC) signaling, to utilize a predetermined slot offset value of the plurality of slot offset values for transmitting the at least one A-SRS transmission in response to the at least one A-SRS transmission being triggered by downlink signaling that does not include the slot offset value indicator.

20. The method of claim 15, wherein the DCI is configured to trigger transmission of aperiodic channel status information (A-CSI) by the UE and including a CSI request; and
wherein a combined number of bits in the DCI for transmitting the slot offset value indicator and the CSI request is limited by a first predetermined number of bits.

21. A user equipment (UE) for wireless communication, comprising:
one or more processors; and
one or more memories coupled to the one or more processors,
wherein the one or more processors are configured to:
receive a radio resource control message comprising configuration information of a plurality of sounding reference signal (SRS) resource sets, wherein each of the plurality of SRS resource sets is configured with a respective plurality of slot offset values for aperiodic sounding reference signal (A-SRS) transmissions using at least one SRS resource set of the plurality of SRS resource sets;
receive, at the UE, a downlink control indicator (DCI) comprising a first field that comprises a trigger signal, a time-domain resource allocation (TDRA) field, and a second field that is separate from the first field and the TDRA field, and the second field comprises a slot offset value indicator, wherein the slot offset value indicator is configured to indicate a particular slot offset value of the plurality of slot offset values for A-SRS transmissions by the UE, and the trigger signal is configured to indicate a particular SRS resource set of the plurality of SRS resource sets;
determine a slot offset to transmit at least one A-SRS transmission based on the slot offset value indicator; and
transmit the at least one A-SRS transmission with the determined slot offset and the particular SRS resource set.

22. The UE of claim 21, wherein the slot offset value indicator further is configured to include a plurality of codepoint values, wherein each codepoint value is associated with a corresponding offset value in the respective plurality of slot offset values.

23. The UE of claim 21, wherein the DCI comprises at least one field corresponding to the slot offset value indicator.

24. The UE of claim 23, wherein the at least one field comprises a plurality of UE-specific fields in the DCI, wherein each one of the plurality of UE-specific fields provides a slot offset value to a different UE.

25. The UE of claim 21, wherein the one or more processors are further configured to:
configure the UE, using received radio resource control (RRC) signaling, to utilize a predetermined slot offset value of the plurality of slot offset values for transmitting the at least one A-SRS transmission in response to the at least one A-SRS transmission being triggered by downlink signaling that does not include the slot offset value indicator.

26. The UE of claim 21, wherein the one or more processors are further configured to:
receive the slot offset value indicator within a downlink control indicator (DCI), wherein the DCI is configured to trigger transmission of aperiodic channel status information (A-CSI) by the UE and including a CSI request; and
wherein a combined number of bits in the DCI for transmitting the slot offset value indicator and the CSI request is limited by a first predetermined number of bits.

27. The method of claim 1, wherein the slot offset value indicator comprises a plurality of codepoint values associated with a plurality of slot offset values.

28. The apparatus of claim 8, wherein the slot offset value indicator comprises a plurality of codepoint values associated with a plurality of slot offset values.

29. The method of claim 15, wherein the slot offset value indicator comprises a plurality of codepoint values associated with a plurality of slot offset values.

30. The UE of claim 21, wherein the slot offset value indicator comprises a plurality of codepoint values associated with a plurality of slot offset values.

\* \* \* \* \*